(12) United States Patent
Prahladka et al.

(10) Patent No.: US 8,676,777 B1
(45) Date of Patent: Mar. 18, 2014

(54) DETERMINING GEOGRAPHIC AREAS OF INTEREST FOR A QUERY

(71) Applicant: Google Inc., Mountain View, CA (US)

(72) Inventors: Piyush Prahladka, Sunnyvale, CA (US); Trystan G. Upstill, Palo Alto, CA (US); Pratik Worah, Chicago, IL (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,194

(22) Filed: Oct. 3, 2012

(51) Int. Cl.
*G06F 17/30* (2006.01)
(52) U.S. Cl.
USPC ........... 707/706; 706/703; 706/722; 706/736; 706/758; 706/781
(58) Field of Classification Search
USPC ................................................. 707/600–899
See application file for complete search history.

(56) References Cited

U.S. PATENT DOCUMENTS

2009/0282029 A1* 11/2009 Koenigstein et al. ............. 707/5

* cited by examiner

*Primary Examiner* — Isaac M Woo
(74) *Attorney, Agent, or Firm* — Fish & Richardson P.C.

(57) ABSTRACT

Methods, systems, and apparatus for selecting geographic areas of interest for a query. A method includes for each query stored in search log data, determining an origin location for each occurrence of the query, determining a content location for each occurrence of the query, for each of a plurality of catchment areas, determining catchment area matches for the query based on the origin location of each occurrence of the query and the content location of the occurrence of the query, determining, for each catchment area, a catchment area score that is indicative of an interest level for the catchment area for a query, the determination based on a number of catchment area matches for the catchment area for the query and selecting, for the query and based on the catchment area scores for the catchment areas, one of the catchment areas as a selected catchment area for the query.

21 Claims, 4 Drawing Sheets

US 8,676,777 B1

DETERMINING GEOGRAPHIC AREAS OF INTEREST FOR A QUERY

BACKGROUND

This specification relates to data processing and indexing.

The Internet provides access to a wide variety of resources such as video or audio files, web pages for particular subjects, book articles, or news articles. A search system can identify resources in response to a search query. The search system ranks the resources based on their relevance to the search query and on measures of quality of the resources and provides search results that link to the identified resources. The search results are typically ordered for viewing according to the ranking

SUMMARY

The subject matter of this disclosure determines catchment areas for queries.

In general, one innovative aspect of the subject matter described in this specification can be embodied in methods that include the actions of for each of a plurality of queries stored in search log data, each of the queries comprising one or more terms, and each of the queries having one or more occurrences of the same one or more terms in the search log data: determining an origin location for each occurrence of the query, the origin location being a location from which the occurrence of the query is determined to have originated; determining a content location for each occurrence of the query, the content location being a location specified by content related to the occurrence of the query, the content location being independent of the origin location; for each of a plurality of catchment areas, determining catchment area matches for the query based on the origin location of each occurrence of the query and the content location of the occurrence of the query; determining, for each catchment area, a catchment area score that is indicative of an interest level for the catchment area for a query, the determination based on a number of catchment area matches for the catchment area for the query; and selecting, for the query and based on the catchment area scores for the catchment areas, one of the catchment areas as a selected catchment area for the query. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Search query processing can be performed more efficiently by selecting search results using query catchment areas. The catchment area for a query can be applied across multiple different catchment areas of the same type (e.g., cities or states for city catchment areas or state catchment areas), and even for particular catchment areas from which a particular query has been received few, if any, times prior. The catchment area for the queries are determined from user behavior, which results in a natural emergence of catchment areas, and such catchment areas may be more accurate the manually selected catchment areas.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
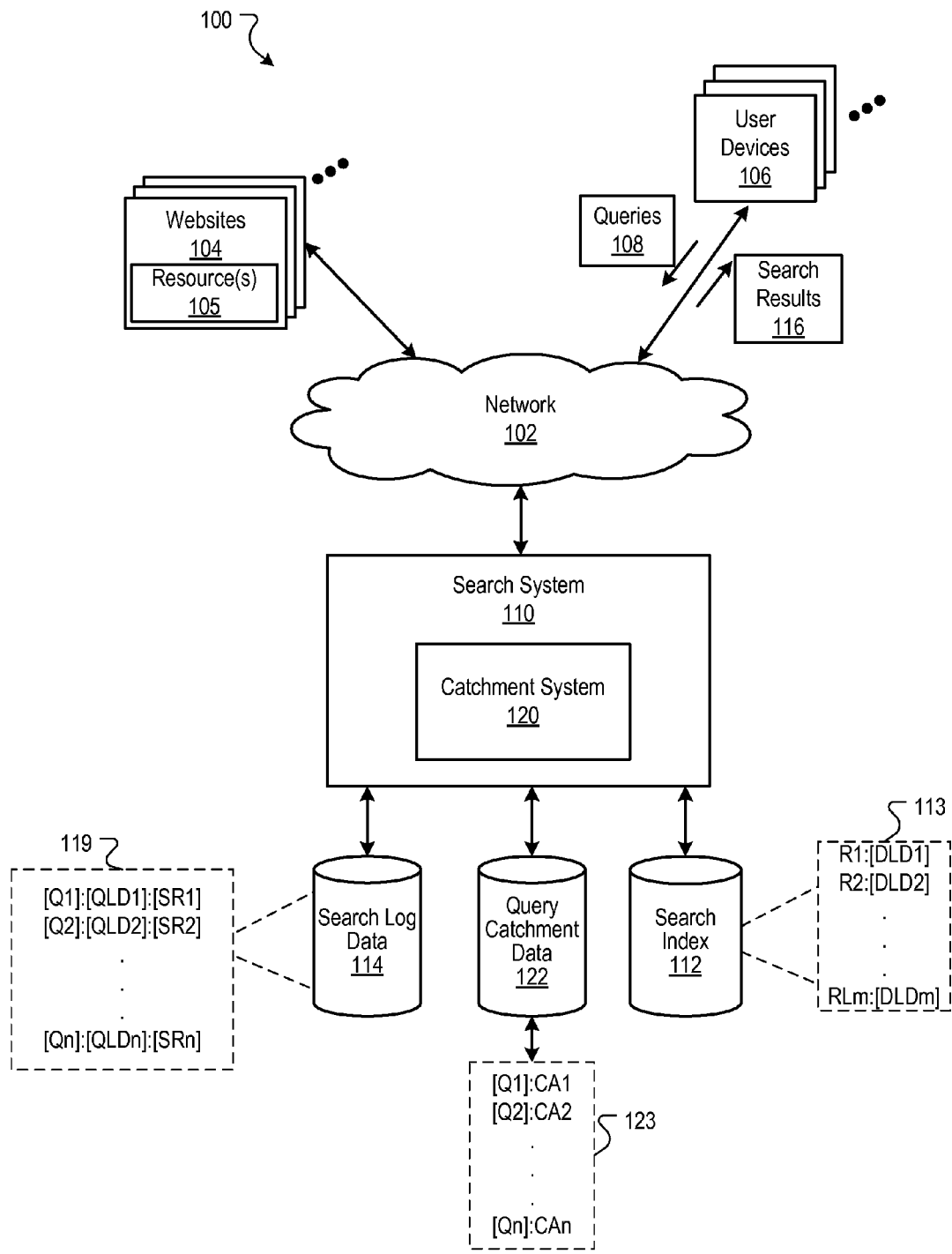
FIG. 1 is a block diagram of an example environment in which a search system provides search services.

The system of this disclosure determines catchment areas for queries retrieved from search log data. Each query includes one or more terms, and each of the queries has one or more occurrences of the same one or more terms in the search log data. For example, if the query [foo] occurs 100 times in the search log data, there are 100 occurrences of the query.

For each occurrence of the query, the system determines an origin location and a content location for the query. The origin location is a location from which the occurrence of the query is determined to have originated. The content location is a location specified by content related to the occurrence of the query. For each of a set of catchment areas, the system determines catchment area matches for the query based on the origin location of each occurrence of the query and the content location of the occurrence of the query. Then, for each catchment area, the system determines a catchment area score that is indicative of an interest level for the catchment area for a query. The determination is based on a number of catchment area matches for the catchment area for the query. Based on the catchment area scores for the catchment areas, the system selects one of the catchment areas as a selected catchment area for the query.

Any appropriate type of content location can be used for a query. One type of content location is a document location. A document location is a location of a document referenced by a search result selected for the query. Another type of content location is a location term that is included in the query in addition to the one or more terms of the query, e.g., [foo <Location>].

Likewise, any appropriate type of catchment area analysis to determine catchment area matches can be used. For example, for document locations, a click log analysis can be used to determine catchment area matches, and for location terms, a query frequency analysis can be used to determine catchment area matches.

For the click log analysis, a catchment area match occurs when the origin location for an occurrence of the query and the document location for the occurrence of the query are located within the same catchment area. For example, for a query [foo] having an origin location in Mountain View and a document location in Mountain View, a catchment area match would occur for the catchment areas of city, metro and state. Conversely, for a query [foo] having an origin location in Mountain View and a document location in Sacramento, a catchment area match would occur only for the catchment area of state.

For the frequency log analysis, examples location terms include city names, state names, etc. A catchment area type is determined for the location term of the occurrence of the query. A catchment area match for a catchment area is counted only when an occurrence of the query has a location term that specifies the catchment area of the catchment area type in which the origin location for the occurrence of the query is located. For example, for the query [foo Mountain View] that originated from the city of Mountain View, a catchment area match is determined only for the catchment area of city. Likewise, for the catchment area of [foo California] that originated from any location in the state of California, a catchment area match is determined only for the catchment area of state.

Catchment area scores are then determined for the catchment areas based on the catchment area matches, and a catchment area for the query is selected based on the catchment area scores. The selection of a catchment area can be further dependent on the catchment area meeting a diversity threshold, which corresponds to a threshold number of catchment areas of a same type that cover different geographic areas and having constituent catchment area scores that meets a constituent catchment area score threshold. This ensures that a particular query [foo] for which a catchment area is selected is applicable to all catchment areas of the same type (e.g., multiple cities), and not just one particular instance of the catchment area (e.g., a particular city). Other data filtering and normalization techniques can also be used on the catchment area scores to select a catchment area.

These features and other features are described in more detail below.

Example Environment

FIG. 1 is a block diagram of an example environment 100 in which a search system 110 provides search services. The example environment 100 includes a network 102, e.g., the Internet, connects publishers 104, user devices 106, and the search system 110. The environment 100 may include many thousands publishers and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by the web site 104 over the network 102 and that is associated with a resource address. Resources 105 include HTML pages, word processing documents, and portable document format (PDF) documents, images, video, and feed sources, to name just a few. The resources can include content, e.g., words, phrases, images and audio and may include embedded information (e.g., meta information and hyperlinks) and/or embedded instructions (e.g., scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided by the publishers 104. Data about the resources 105 can be indexed in a search index 112. The resources can also be indexed according to a document location (e.g., a geographic location) for the resource, as indicated by the data structure portion 113. In the data structure portion 113, each resource R has corresponding document location data DLD describing a document location for the resource R. The document location is a location to which the subject matter of the resource pertains, and is independent of the actual location at which the resource is hosted. For example, a document location may be a business location for the resource for a business for which the resource is provided. A document location may also be a location of a government entity, e.g., documents related to the state laws of California may have a document location of Sacramento. Other types of document locations may also be used (e.g., a location of a state park for a web page describing the state park, etc.).

The document locations are part of the search index 112 and can be determined in a variety of appropriate ways. For example, the document location for a resource can be determined based on contents of the resource. To illustrate, assume a business address is specified at a "Contact Us" web page for a business for which the resource is provided. Alternatively, the document location for the resource can also be determined based on a map data that specify a geographic location of subject matter of the resource. The document location data DLD can thus specify an address or geographic coordinates, or a larger area, such as a city or a state.

The user devices 106 submit search queries 108 to the search system 110. In response, the search system 110 accesses the search index 112 to identify resources 105 that are determined to be relevant to the search query 108 (i.e. candidate resources), for example based on relevance scores computed for the resources 105. The search system 110 selects resources 105, generates search results 109 that identify the resources 105, and returns the search results 109 to the user devices 106. A search result 109 is data generated by the search system 110 that references a resource 105 that is responsive to a particular search query, and includes an active link (e.g., a URL) to the resource. An example search result 109 can include a web page title, a snippet of text or a portion of an image extracted from the web page, and the URL of the web page.

A variety of appropriate scoring and ranking algorithms can be used by the search system 110 to score resources in response to a query. For example, a result score for a resource 105 can be computed based on an information retrieval ("IR") score corresponding to the resource 105, and, optionally, a quality score of the resource 105 relative to other available resources. A presentation order for the search results 109 can be selected based on the result scores. In turn, data that causes presentation of the search results 109 according to the presentation order can be provided to the user device 106.

In some implementations, the search system 110 accesses query catchment data 122 for a received query to determine a catchment area for a query. The data structure 123 illustrates that for a number n of queries Q, corresponding catchment areas CA have been determined for each query. The catchment system 120 determines the catchment areas, and the operation of the catchment system 120 is described in more detail below.

In some implementations, when a query is determined to have a catchment area, the query location, catchment area of the query, and the document locations can be used to adjust result scores. For example, for a query with a catchment area of "city" that is issued from a particular city, resources with document locations within the catchment area of the particular city may receive a scoring or ranking boost in relevance. Such a scoring adjustment may be, for example, a proximity boost that adjusts a score based on a proximity of a document location in the catchment area of the query to the query location, or a fixed scoring adjustment that is applied to any resource within document location in the catchment area of the query. Other appropriate scoring adjustments can also be used.

User devices 106 receive the search results 109 and render the search results 109 for presentation to users. In response to the user selecting (e.g., clicking) a link (e.g., URL) in a search result at a user device 106, the user device 106 requests the resource 105 referenced by the link. The web site 104 hosting the resource 105 receives the request for the resource 105 from the user device 106 and provides the resource 105 to the requesting user device 106.

Search queries 108 submitted during user sessions and result data (i.e., data specifying search results that were provided in response to the search queries and/or search results that were selected) are stored in a data store such as the search log data store 114. Interaction data specifying user actions taken in response to presentation of search results 109 are also stored in the search log data store 114. The interaction data can specify whether a particular search result was selected (e.g., clicked) by a user, and can also specify the resource that was referenced by the particular search result. In some implementations, location data specifying a query location QL for the search query that was submitted by the user can also be stored in the search log data store 114 and associated with (i.e., indexed according to or stored at a memory location assigned to) the resources referenced by the search result that the user selected. A query location QL can be determined, for example, by resolving an IP address to a location; by location data provided with the query; or by any other appropriate location process.

The data stored in the search log data store 114 can be used to map search queries 108 submitted during search sessions to resources 105 that were identified in search results 109, actions taken by users, and query locations for the search queries. As illustrated in the data structure portion 119, each query Q is associated with its corresponding query location data QLD specifying the location from which the query originated, and search result data SR specifying a search result (or search results) that were presented in response to the query and selected by a user.

Determining Query Catchment Areas for Queries

The catchment system 120 determines catchment areas for queries by processing the search log data 118. In some implementations, a catchment area for a query is one of multiple types, such as one of a city catchment area type, a metro catchment area type, and a state catchment area type. The catchment system 120 processes the query logs for queries from multiple different locations and different respective catchment areas to determine a catchment area type for each query. The catchment area type is then applied to any matching query received from a user.

Figure 2:
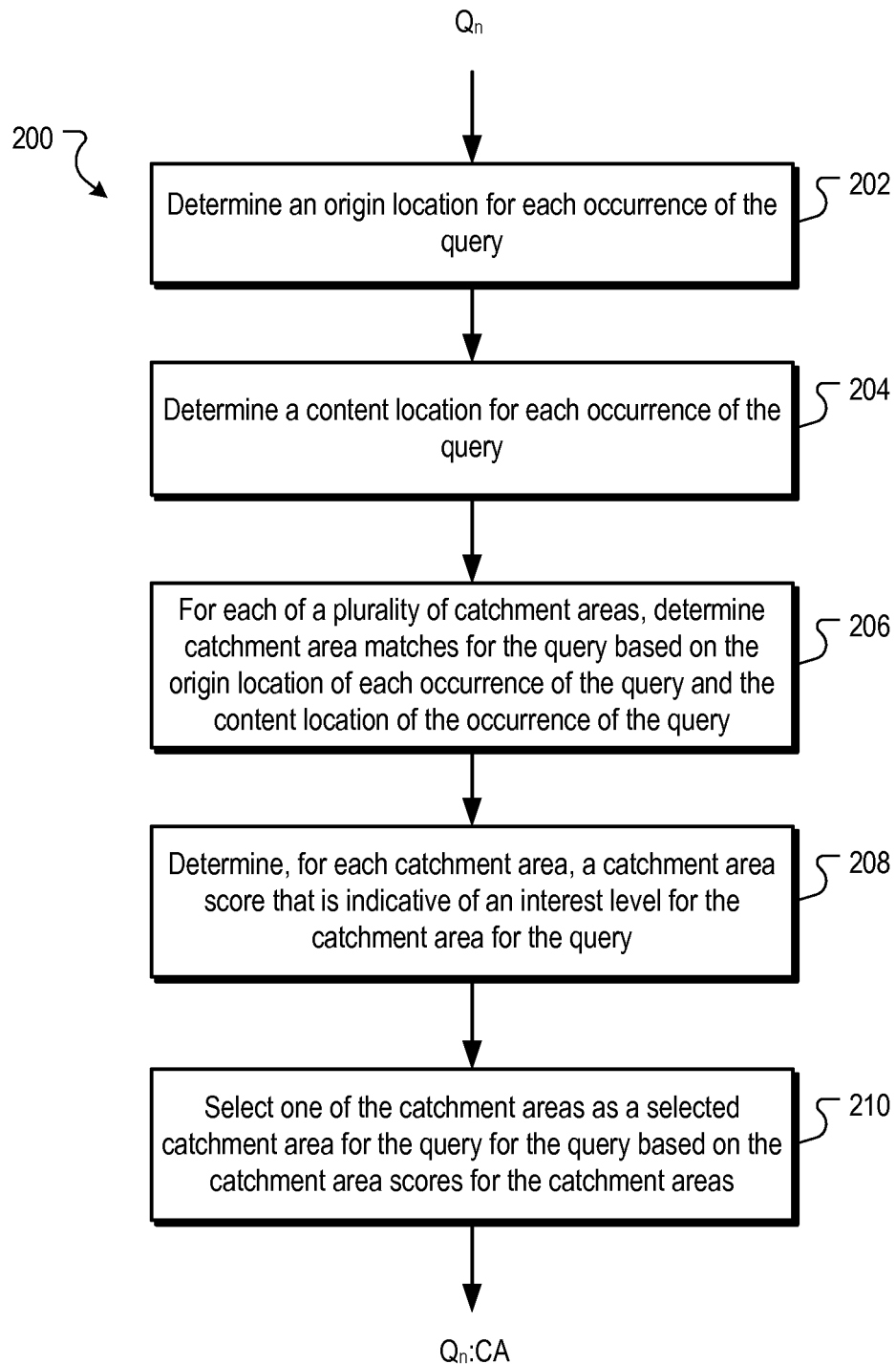
FIG. 2 is a flow diagram of an example process for determining catchment areas for queries.

FIG. 2 is a flow diagram of an example process 200 for determining catchment areas for queries. The process 200 is implemented in the catchment system 120, which is realized by a data processing apparatus of one or more computers. The process 200 accesses the query data stored in the search log data 114. As described above, the search log data 114 stores data for each query submitted to the search system 110. As the same query of one or more terms may be submitted by multiple users from many different locations, there are multiple occurrences of the same query in the search log data. The process 200 operates on each query, processing each occurrence of the query that is selected.

The process 200 determines an origin location for each occurrence of the query $Q_n$ (202). For example, the process 200 accesses the query location data QLD in the search log data 114 that describes a location from which the occurrence of the query is determined to have originated. The location may be an address, geographic coordinates, or a city name, for example.

The process 200 determines a content location for each occurrence of the query $Q_n$ (204). The content location is specified by content related to the occurrence of the query, and is determined independent origin location of the query, i.e., the origin location data of the query does not define the content location of the query. However, the content location may be the same as the origin location (e.g., both the content location and the origin location may be, for example, a particular city). The processing of two example content locations—document locations and location terms—are described below. Using a document location as a content location is described with respect to FIGS. 3 and 4, and using a location term in a query as a content location is described with respect to FIGS. 5 and 6.

For each of a plurality of catchment areas, the process 200 determines catchment area matches for the query based on the origin location of each occurrence of the query and the content location of the occurrence of the query (206). A catchment area match indicates that a catchment area is of particular interest for a query. Catchment area matching based on document locations is described with respect to FIG. 4, and catchment area matching based on location terms is described with respect to FIG. 6.

The process 200 determines, for each catchment area, a catchment area score that is indicative of an interest level for the catchment area for a query (208). The determination is based on a number of catchment area matches for the catchment area for the query. In some implementations, a catchment area count <C> of catchment area matches for the query is determined for each catchment area. Occurrences of the query may span multiple different query locations from different particular catchment areas. For example, the query [foo] may be received from multiple different cities and states in the United States. Accordingly, the process 200 generates constituent catchment area scores <c> for catchment areas of the same type and that cover a plurality of different geographic areas. Table 1 below illustrates an example for constituent catchment area scores for queries across multiple catchment areas:

TABLE 1

|       | Q1  | Q2  | ... | Qn  |
|-------|-----|-----|-----|-----|
| CAC-1 | <c> | <c> | ... | <c> |
| CAC-2 | <c> | <c> | ... | <c> |
| ...   | ... | ... | ... | ... |
| CAC-x | <c> | <c> | ... | <c> |
| CAM-1 | <c> | <c> | ... | <c> |
| CAM-2 | <c> | <c> | ... | <c> |
| ...   | ... | ... | ... | ... |
| CAM-y | <c> | <c> | ... | <c> |
| CAS-1 | <c> | <c> | ... | <c> |
| CAS-2 | <c> | <c> | ... | <c> |
| ...   | ... | ... | ... | ... |
| CAS-z | <c> | <c> | ... | <c> |

Three catchment area types are shown—city (CAC), metro (CAM) and state (CAS). CAC-1-CAC-x correspond to catchment areas for city 1-city x, and so on. For each query Q1-Qn, constituent catchment area scores <c> are determined for each catchment area. The catchment area score for each catchment area type is based on the constituent catchment area scores. For example, the catchment area score for the catchment area of "city" for the query Q1 may be the sum of scores <c> for catchment areas CAC-1-CAC-x in the first column. Likewise, the scores for the metro catchment areas and the state catchment area may be respectively summed to determine the catchment area scores for the metro catchment area and state catchment area, and so on.

In some implementations, constituent catchment area scores <c> are capped to preclude an otherwise large particular catchment area score <c> alone resulting in the selection of a catchment area for a query. For example, a particular query Q may describe a particular subject that is of particular interest for users in a particular city with a large population (e.g., Los Angeles, Calif.). The number of occurrences of the query Q from the city of Los Angeles, and the number of resulting catchment area matches for the catchment area of "city" may be so large (e.g., 52,000) that the catchment system 120 would select the catchment area of "city" for the query Q. However, the particular subject may be of little interest to users that are not within the Los Angeles area. Thus, selecting the catchment area of "city" for the query Q will not result in more relevant results for users in other cities (e.g., New York, San Francisco, Miami, etc.) that issue the query Q. Accordingly, the constituent catchment area score for the city catchment area may be capped to a constituent scoring cap (e.g., 5,000). The value of the cap may be selected such that a catchment area cannot be selected for a query unless the cap value is combined with constituent catchment area scores of other catchment areas of the same type. The cap value can be a fixed raw count value as shown, a percentage of occurrences of the query, or some other value that ensures that any one catchment area cannot be selected for a query unless the cap value is combined with constituent catchment area scores of other catchment areas of the same type for the query. Furthermore, different constituent scoring caps can be used for each respective catchment area type. For example, the catchment area of "city" may have a constituent scoring cap of 5,000; the catchment area of "metro" may have a constituent scoring cap of 15,000; and so on.

In variations of this implementation, each constituent catchment area score may be required to meet a constituent catchment area score threshold before the constituent score can be counted. A constituent catchment area score threshold can be used, for example, to ensure that anomalous or statistically insignificant results for a particular catchment area are ignored. The constituent catchment area score threshold can be a fixed raw count value, a percentage of occurrences of the query, or some other value that ensures that catchment score is statistically significant.

The process 200 selects one of the catchment areas as a selected catchment area for the query based on the catchment area scores for the catchment areas (210). For example, the catchment area with the highest catchment area score of the catchment areas is selected as a selected catchment area for the query.

In some implementations, a catchment area score must meet a catchment area score threshold before the catchment area can be selected for a query. The score threshold may be, for example, a fixed raw count value, a percentage of occurrences of the query, or some other value that ensures that catchment score is statistically significant. By way of another example, the catchment area score may be a ratio of the catchment area match value to a total count of occurrences of the query, e.g., $$X_{Cn} = C_n / \#Q_n$$

where $C_n$ is the catchment area count for a catchment area CA for query $Q_n$;

$\#Q_n$ is the number of occurrences of the query $Q_n$; and $X_{Cn}$ is the catchment area score for the catchment area CA.

Provided $X_{Cn}$ is the largest of the catchment area scores for the query $Q_n$, and exceeds a catchment area score threshold, it corresponding catchment area CA is selected as the catchment area for the query $Q_n$.

In some implementations, the selection of a catchment area is dependent on the catchment area meeting a diversity threshold, which corresponds to a threshold number of catchment areas of a same type that cover different geographic areas. This ensures that a particular query [foo] for which a catchment area is selected is applicable to all catchment areas of the same type (e.g., multiple cities), and not just one particular instance of the catchment area (e.g., a particular city). In particular, the catchment area diversity threshold specifies a threshold number of catchment areas of a same type that cover different geographic areas and that have constituent catchment area scores that meet a constituent catchment area score threshold. The constituent catchment area score threshold can be a fixed raw count value, a percentage of occurrences of the query, or some other value. The diversity threshold value can vary depending on the catchment area. In some implementations, the diversity threshold value is proportional to the number of catchment areas of the particular type. For example, the city catchment area corresponds to cities, while the state catchment area corresponds to states. Thus, the diversity threshold value for the city catchment area is larger than the diversity threshold value for the state catchment area.

As described above, document locations and location terms can be used as content locations for a query. The following sections describe the processing of document locations and location terms.

Content Location Based on Document Locations

Figure 3:
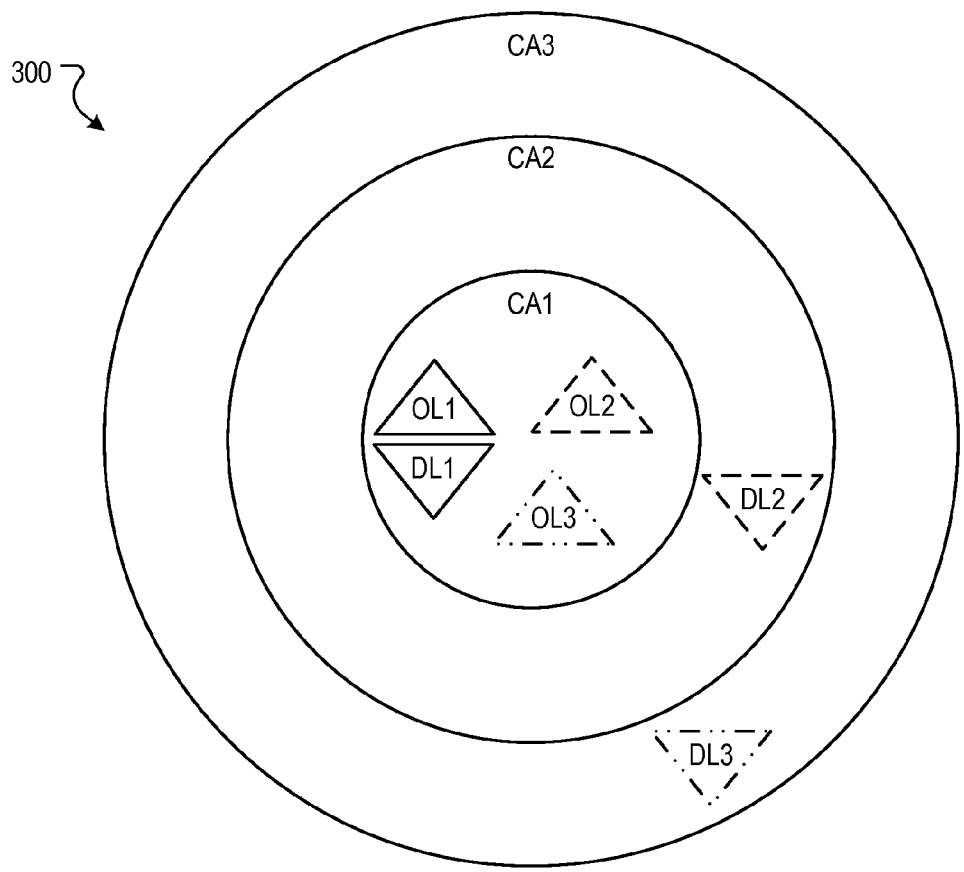
FIG. 3 is a diagram of catchment areas and locations based on search result selections for queries.

FIG. 3 is a diagram 300 of catchment area and locations based on search result selections for queries. Three catchment areas are show—CA1, CA2, and CA3. For example, CA1 may be a city catchment area CA1, CA2 may be a metro catchment area, and CA3 may be a state catchment area. Only three catchment areas are shown so as to avoid drawing congestion. Multiple city catchment areas may overlap with a metro catchment area, and multiple metro catchment areas may overlap with a state catchment area. Additionally, other catchment area types may also be processed.

Pairs of origin locations OL and document locations DL are shown for three different queries Q1, Q2 and Q3: {OL1, DL1}, {OL2, DL2}, and {OL3, DL3}. Each pair corresponds to a document location DL of a resource referenced by a search result that is selected by a user in response to the occurrence of a query with the respective query location QL. In the diagram 300, each origin location OL has one corresponding document location DL, e.g., {OL1, DL1}, {OL2, DL2}, and {OL3, DL3}. However, if more than one search result is selected for a query, then an origin location may have more than one corresponding document location. In the case of the latter, the origin location is pairwise processed for each document location to determine a catchment area match.

Figure 4:
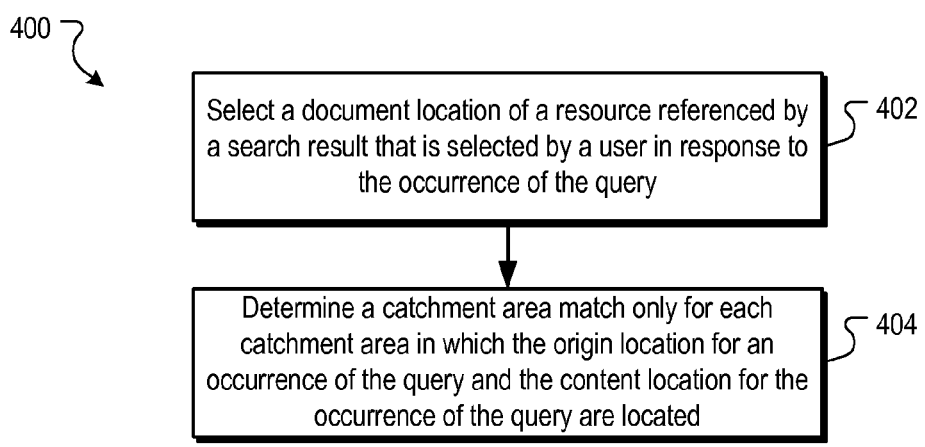
FIG. 4 is a flow diagram of an example process for determining catchment area matches for a query based on search result selections for the query.

The process of determining a catchment area match for origin locations and document locations is described with reference to FIG. 4. The process 400 is implemented in the catchment system 120, which is realized by a data processing apparatus of one or more computers.

The process 400 selects a document location of a resource referenced by a search result that is selected by a user in response to the occurrence of a query (402). For example, the catchment system 120 accesses the search index 112 to determine the document location DL for a particular resource.

The process determines a catchment area match only for each catchment area in which the origin location for an occurrence of the query and the content location for the occurrence of the query are located (404). For example, assume CA1 corresponds to the city catchment area for the city of San Francisco; CA2 corresponds to the metro catchment area of "Bay Area" which encompasses San Francisco and surrounding suburbs, and that CA3 corresponds to the state catchment area for California.

With respect to the location pair {OL1, DL1} for the query Q1, both locations occur in the catchment area of San Francisco. Accordingly the catchment area "city" receives a catchment area match for the occurrence of the query Q1. Additionally, both locations occur in the catchment area of "Bay Area," and thus the catchment area "metro" receives a catchment area match for the occurrence of the query Q1. Finally, the both locations occur in the catchment area of "state," and thus the catchment area "state" receives a catchment area match for the occurrence of the query Q1.

With respect to the location pair {OL2, DL2} for the query Q2, the origin location is San Francisco, and the document location is within the metro catchment area, e.g., the city of Fremont, Calif. Accordingly the catchment area "city" does not receive a catchment area match for the occurrence of the query Q2. Conversely, both locations occur in the catchment area of "Bay Area," and thus the catchment area "metro" receives a catchment area match for the occurrence of the query Q2, and both locations occur in the catchment area of "state," and thus the catchment area "state" receives a catchment area match for the occurrence of the query.

With respect to the location pair {OL3, DL3} for the query Q3, the origin location is San Francisco, and the documents location is within the state catchment area, e.g., the city of Los Angeles, Calif. Accordingly the catchment areas of "city" and "state" do not receive a catchment area match for the occurrence of the query Q3. However, the catchment area of "state" does receive a match for the query Q3, as both locations occur in the catchment area of "state."

Assuming various thresholds and diversity requirements are ignored, the following catchment areas would be respectively selected for the queries Q1, Q2 and Q3: CA1, CA2, and CA3. This is because an origin location and document location pair will create catchment area matches for each catchment area in which both locations are located. Thus, when a particular occurrence of a query generates a catchment area match for city, metro and state catchment areas, the actual catchment area that is most relevant to the query is the city catchment area. In other words, when catchment area matches are determined for a root catchment area and descendent catchment areas (e.g., State→Metro→City), the most dependent catchment area in the catchment hierarchy is the actual catchment area that is most relevant to the query is the city catchment area.

A catchment area selection scheme that takes into account the hierarchal scoring determines a respective catchment area score threshold for the city catchment area type, metro catchment area type, and state catchment area type. The score threshold for the city type is less than the score threshold for the metro type, and the score threshold for the metro type is less than the score threshold for the state type. For a particular query, a city catchment area type is selected if the catchment area score for the city catchment area type meets its respective threshold and the catchment area scores for the metro catchment area type and the state catchment area type do not meet their respective thresholds. Likewise, the metro catchment area type is selected for the query if the catchment area score for the metro catchment area type meets its respective threshold and the catchment area score for the state catchment area type does not meet its respective threshold. Finally, the state catchment area type is selected for the query if the catchment area score for the state catchment area type meets its respective threshold.

In another implementation, when catchment area matches are determined for a root catchment area and descendent catchment areas (e.g., State→Metro→City), only the most dependent catchment area in the catchment hierarchy receives a catchment area match. For example, for the query Q1 with the location pair {OL1, DL1}, only the city catchment area CA1 will receive a catchment area match. In this implementation, the catchment area with the highest resulting score is selected for the query.

Additional processing steps can also be implemented to determine catchment areas from the document locations. For example, catchment area caps, constituent catchment area scoring thresholds, and diversity thresholds can be used to ensure that a catchment area is not selected for query unless the query appears to be relevant to multiple different catchment areas of the same type, e.g., multiple different cities, multiple different states, etc.

Query Location Based on Document Locations

Figure 5:
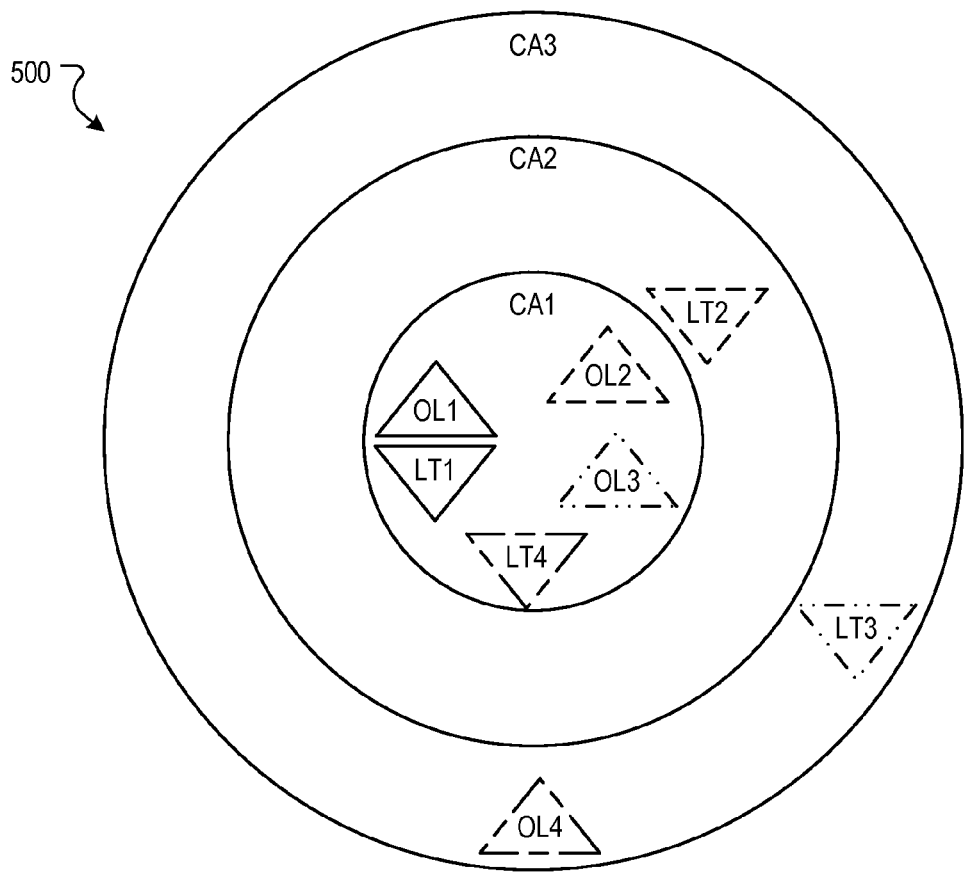
FIG. 5 is a diagram of catchment areas and locations based on queries that include location terms.

FIG. 5 is a diagram 500 of catchment areas and locations based on queries that include location terms. Pairs of origin locations OL and document locations DL are shown for four different queries Q1, Q2, Q3 and Q4: {OL1, LT1}, {OL2, LT2}, {OL3, LT3}, and {QL4, LT4}. Each pair corresponds to location term LT included in an occurrence of a query with the respective query location QL. Assume queries Q1, Q2 and Q3 query each have an origin location of San Francisco, and assume query Q4 has an origin location of Los Angeles. Each query is of the form [<query terms> <location term>]. For example, the query Q1 may be [foo San Francisco], the query Q2 may be [boo Bay Area], the query Q3 may be [goo California], and the query Q4 may be [moo San Francisco]. The queries and terms are summarized in table 2 below.

TABLE 2

| Query | Origin Location | Location Term |
|---|---|---|
| foo San Francisco | San Francisco | San Francisco |
| boo Bay Area | San Francisco | Bay Area |
| goo California | San Francisco | California |
| moo San Francisco | Los Angeles | San Francisco |

Figure 6:
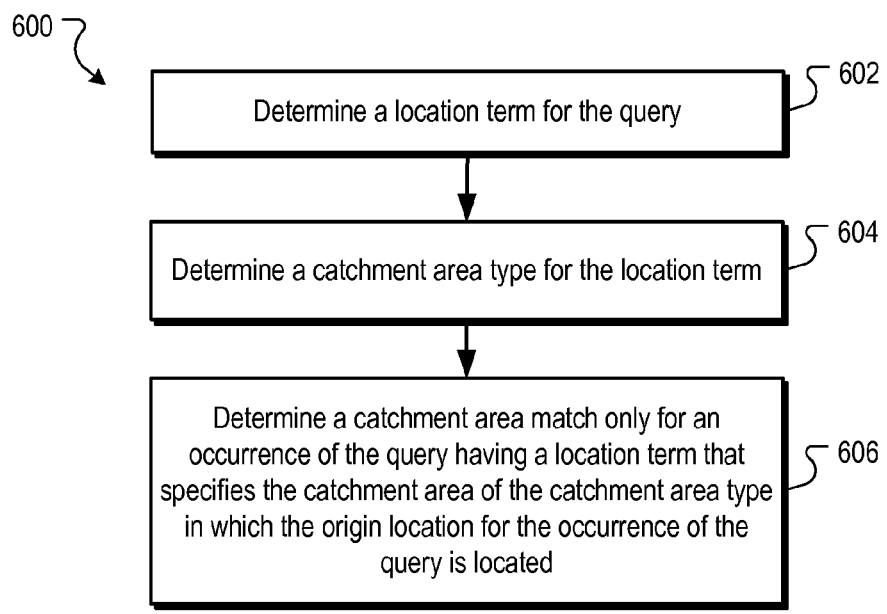
FIG. 6 is a flow diagram of an example process for determining catchment area matches for a query based on frequencies of the query.

FIG. 6 is a flow diagram of an example process 600 for determining catchment area matches for a query based on frequencies of the query. The process 600 is implemented in the catchment system 120, which is realized by a data processing apparatus of one or more computers.

The process 600 determines a location term for a query (602). For example, for the query Q1-Q4, the respective location terms in the third column of table 2 are determined. The terms can be determined based on term look-up tables, term matching, or other term and/or language processing techniques.

The process 600 determines a catchment area type for the location term (604). For example, the term "San Francisco" matches a "city" type; the term "Bay Area" matches a "metro" type, and the term "California" matches a "state" type. The catchment area types can be determined by referencing a look-up table that references location terms to catchment area types, or some other appropriate mapping process.

The process 600 determines a catchment area match only for an occurrence of the query having a location term that specifies the catchment area of the catchment area type in which the origin location for the occurrence of the query is located. The corresponding catchment area types and matches are shown in table 3 below.

TABLE 3

| Query | Origin Location | Location Term | Area Type | Match |
|---|---|---|---|---|
| foo San Francisco | San Francisco | San Francisco | City | City |
| boo Bay Area | San Francisco | Bay Area | Metro | Metro |
| goo California | San Francisco | California | State | State |
| moo San Francisco | Los Angeles | San Francisco | City | — |

For query Q1, the catchment area type is "city," and the location term specifies the catchment area for the city of San Francisco. The origin location is San Francisco, and is within the city catchment area for San Francisco. Thus, a catchment area match occurs for the catchment area type of "city" for the query Q1.

For query Q2, the catchment area type is "metro," and the location term specifies the catchment area for the metro Bay Area. The origin location is San Francisco, and is within the metro catchment area for the metro Bay Area. Thus, a catchment area match occurs for the catchment area type of "metro" for the query Q2.

For query Q3, the catchment area type is "state," and the location term specifies the catchment area for the state of California. The origin location is San Francisco, which is in the state of California. Thus, a catchment area match occurs for the catchment area type of "state" for the query Q3.

For query Q4, the catchment area type is "city," and the location term specifies the catchment area for the city of San Francisco. The origin location, however, is Los Angeles, and Los Angeles is not within the city catchment area of the city of San Francisco. Thus, a catchment area match is not generated from that occurrence of the query Q4.

The process 500 processes queries, generating respective catchment area matches for each query. For each query, a catchment area is then selected for the query and based on the catchment area scores for the catchment areas for the query. The catchment area, for example, with the highest catchment area score may be selected for the query.

For example, assume that the catchment area scores for catchment areas are the respective number of matches for a query that occur from all occurrences of the query. Also assume that the catchment system 120 determines the following matches the query of the form [foo <location>] after processing the search log data 114: city: 11,400; metro: 987; state: 323. In this situation, the query "foo" would be associated with the catchment area of "city."

Additional processing steps can also be implemented to determine catchment areas from the frequency of location terms. For example, catchment area caps, constituent catchment area scoring thresholds, and diversity thresholds can be used to ensure that a catchment area is not selected for query unless the query appears to be relevant to multiple different catchment areas of the same type, e.g., multiple different cities, multiple different states, etc.

Additional Implementation Details

Although the examples above are described in the context of city, metro and state catchment areas, other catchment areas can also be used. For example, sub-city catchment areas, neighborhood catchment areas, or even catchment areas that are emergent from data mining techniques can be used.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   for each of a plurality of queries stored in search log data, each of the queries comprising one or more terms, and each of the queries having one or more occurrences of the same one or more terms in the search log data:
   determining an origin location for each occurrence of the query, the origin location being a location from which the occurrence of the query is determined to have originated;
   determining a content location for each occurrence of the query, the content location being a location specified by content related to the occurrence of the query, the content location being independent of the origin location;

for each of a plurality of catchment areas, determining catchment area matches for the query based on the origin location of each occurrence of the query and the content location of the occurrence of the query;

determining, for each catchment area, a catchment area score that is indicative of an interest level for the catchment area for a query, the determination based on a number of catchment area matches for the catchment area for the query; and selecting, for the query and based on the catchment area scores for the catchment areas, one of the catchment areas as a selected catchment area for the query.

2. The method of claim 1, wherein:

determining the content location for each occurrence of the query comprises selecting a document location of a resource referenced by a search result that is selected by a user in response to the occurrence of the query; and determining catchment area matches for the query for each catchment area comprises determining a catchment area match only for each catchment area in which the origin location for an occurrence of the query and the content location for the occurrence of the query are located.

3. The method of claim 2, wherein:

determining the catchment area score for each catchment area comprises generating a catchment area count of catchment area matches for the query; and selecting, for the query and based on the catchment area scores for the catchment areas, one of the catchment areas as a selected catchment area for the query comprises selecting the catchment area with the highest catchment area score and that meets a catchment area score threshold.

4. The method of claim 3, wherein:

determining the catchment area score for each catchment area comprises:

generating a total count of occurrences of the query; and generating the catchment area score based on a ratio of the catchment area count to the total count; and selecting, for the query and based on the catchment area scores for the catchment areas, one of the catchment areas as the selected catchment area for the query comprises selecting the catchment area with the highest catchment area score and that meets a catchment area score threshold.

5. The method of claim 2, wherein:

the catchment areas include a city catchment area type, a metro catchment area type, and a state catchment area type;

selecting, for the query and based on the catchment area scores for the catchment areas, one of the catchment areas as the selected catchment area for the query comprises:

determining respective catchment area score threshold for the city catchment area type, metro catchment area type, and state catchment area type; and selecting the city catchment area type if the catchment area score for the city catchment area type meets its respective threshold and the catchment area scores for the metro catchment area type and the state catchment area type do not meet their respective thresholds, selecting the metro catchment area type if the catchment area score for the metro catchment area type meets its respective threshold and the catchment area scores for the state catchment area type does not meet its respective threshold, or selecting the state catchment area type if the catchment area score for the state catchment area type meets its respective threshold.

6. The method of claim 1, wherein:

the catchment areas include a city catchment area type, a metro catchment area type, and a state catchment area type; and determining the catchment area score for each catchment area comprises determining the catchment area score based on constituent catchment area scores determined for catchment areas of the same type and that cover a plurality of different geographic areas.

7. The method of claim 6, wherein selecting, for the query and based on the catchment area scores for the catchment areas, one of the catchment areas as the selected catchment area for the query comprises:

selecting the catchment area with the highest catchment area score and that meets a catchment area diversity threshold, the catchment area diversity threshold being a threshold number of catchment areas of a same type that cover different geographic areas and having constituent catchment area scores that meets a constituent catchment area score threshold.

8. The method of claim 1, wherein:

the catchment areas are categorized according to catchment area types;

determining the content location for each occurrence of the query comprises determining a location term of the query, the location term being a term that is included in the query in addition to the one or more terms of the query;

determining catchment area matches for the query for each catchment area comprises:

for each occurrence of the query, determining a catchment area type for the location term of the occurrence of the query;

determining a catchment area match only for an occurrence of the query having a location term that specifies the catchment area of the catchment area type in which the origin location for the occurrence of the query is located.

9. The method of claim 8, wherein:

determining the catchment area score for each catchment area comprises generating a catchment area count of catchment area matches for the query; and selecting, for the query and based on the catchment area scores for the catchment areas, one of the catchment areas as a selected catchment area for the query comprises selecting the catchment area with the highest catchment area score and that meet a catchment area score threshold.

10. The method of claim 9, wherein:

determining the catchment area score for each catchment area comprises:

generating a total count of occurrences of the query, wherein the total count is based on occurrences queries that include the same one or more terms and is independent of the location terms included in the occurrences of the query; and generating the catchment area score based on a ratio of the catchment area count to the total count; and selecting, for the query and based on the catchment area scores for the catchment areas, one of the catchment areas as the selected catchment area for the query comprises selecting the catchment area with the highest catchment area score and that meets a catchment area score threshold.

11. The method of claim 9, wherein the catchment areas include a city catchment area type, a metro catchment area type, and a state catchment area type.

12. The method of claim 11, wherein:
determining the catchment area score for each catchment area comprises determining the catchment area score based on constituent catchment area scores determined for catchment areas of the same type and that cover a plurality of different geographic areas.

13. The method of claim 12, wherein determining the catchment area score for each catchment area comprises capping each constituent catchment area score that meets a constituent score cap to the constituent scoring cap.

14. The method of claim 12, wherein selecting, for the query and based on the catchment area scores for the catchment areas, one of the catchment areas as the selected catchment area for the query comprises:
selecting the catchment area with the highest catchment area score and that meets a catchment area diversity threshold, the catchment area diversity threshold being a threshold number of catchment areas of a same type that cover different geographic areas and having constituent catchment area scores that meet a constituent catchment area score threshold.

15. A system comprising:
a data processing apparatus; and
a computer storage medium encoded with a computer program, the program comprising instructions that when executed by the data processing apparatus cause the data processing apparatus to perform operations comprising:
for each of a plurality of queries stored in search log data, each of the queries comprising one or more terms, and each of the queries having one or more occurrences of the same one or more terms in the search log data:
determining an origin location for each occurrence of the query, the origin location being a location from which the occurrence of the query is determined to have originated;
determining a content location for each occurrence of the query, the content location being a location specified by content related to the occurrence of the query, the content location being independent of the origin location;
for each of a plurality of catchment areas, determining catchment area matches for the query based on the origin location of each occurrence of the query and the content location of the occurrence of the query;
determining, for each catchment area, a catchment area score that is indicative of an interest level for the catchment area for a query, the determination based on a number of catchment area matches for the catchment area for the query; and
selecting, for the query and based on the catchment area scores for the catchment areas, one of the catchment areas as a selected catchment area for the query.

16. The system of claim 15, wherein:
determining the content location for each occurrence of the query comprises selecting a document location of a resource referenced by a search result that is selected by a user in response to the occurrence of the query; and
determining catchment area matches for the query for each catchment area comprises determining a catchment area match only for each catchment area in which the origin location for an occurrence of the query and the content location for the occurrence of the query are located.

17. The system of claim 16, wherein:
determining the catchment area score for each catchment area comprises generating a catchment area count of catchment area matches for the query; and
selecting, for the query and based on the catchment area scores for the catchment areas, one of the catchment areas as a selected catchment area for the query comprises selecting the catchment area with the highest catchment area score and that meets a catchment area score threshold.

18. The system of claim 17, wherein:
determining the catchment area score for each catchment area comprises:
generating a total count of occurrences of the query; and
generating the catchment area score based on a ratio of the catchment area count to the total count; and
selecting, for the query and based on the catchment area scores for the catchment areas, one of the catchment areas as the selected catchment area for the query comprises selecting the catchment area with the highest catchment area score and that meets a catchment area score threshold.

19. A computer storage medium encoded with a computer program, the program comprising instructions that when executed by a data processing apparatus cause the data processing apparatus to perform operations comprising:
for each of a plurality of queries stored in search log data, each of the queries comprising one or more terms, and each of the queries having one or more occurrences of the same one or more terms in the search log data:
determining an origin location for each occurrence of the query, the origin location being a location from which the occurrence of the query is determined to have originated;
determining a content location for each occurrence of the query, the content location being a location specified by content related to the occurrence of the query, the content location being independent of the origin location;
for each of a plurality of catchment areas, determining catchment area matches for the query based on the origin location of each occurrence of the query and the content location of the occurrence of the query;
determining, for each catchment area, a catchment area score that is indicative of an interest level for the catchment area for a query, the determination based on a number of catchment area matches for the catchment area for the query; and
selecting, for the query and based on the catchment area scores for the catchment areas, one of the catchment areas as a selected catchment area for the query.

20. The computer storage medium of claim 19, wherein:
determining the content location for each occurrence of the query comprises selecting a document location of a resource referenced by a search result that is selected by a user in response to the occurrence of the query; and
determining catchment area matches for the query for each catchment area comprises determining a catchment area match only for each catchment area in which the origin location for an occurrence of the query and the content location for the occurrence of the query are located.

21. The computer storage medium of claim 20, wherein:
determining the catchment area score for each catchment area comprises generating a catchment area count of catchment area matches for the query; and selecting, for the query and based on the catchment area scores for the catchment areas, one of the catchment areas as a selected catchment area for the query comprises selecting the catchment area with the highest catchment area score and that meets a catchment area score threshold.

\* \* \* \* \*